US007790997B2

(12) United States Patent
Girodet et al.

(10) Patent No.: US 7,790,997 B2

(45) Date of Patent: Sep. 7, 2010

(54) SWITCH UNIT HAVING A CIRCUIT BREAKER AND A DISCONNECTOR WITH COMMON DRIVE MEANS

(75) Inventors: Alain Girodet, Chassieu (FR); Christian Lindner, Zürich (CH); Igor Deprez, Chambéry (FR); Olivier Le Grand, Le Conquet (FR)

(73) Assignee: Areva T&D SA, Paris la Defense Cedex (FR)

( * ) Notice: Subject to any disclaimer, the term of this patent is extended or adjusted under 35 U.S.C. 154(b) by 0 days.

(21) Appl. No.: 12/270,736

(22) Filed: Nov. 13, 2008

(65) Prior Publication Data

US 2009/0120907 A1 May 14, 2009

(30) Foreign Application Priority Data

Nov. 13, 2007 (FR) .................................. 07 58996

(51) Int. Cl.
*H02B 13/02* (2006.01)

(52) U.S. Cl. ................... 218/2; 218/4; 218/7; 218/154; 218/155

(58) Field of Classification Search ............... 218/2–21, 218/1, 118–142, 154–155
See application file for complete search history.

(56) References Cited

U.S. PATENT DOCUMENTS 3,590,186 A 6/1971 Brunner
3,956,605 A 5/1976 Roidt et al.

FOREIGN PATENT DOCUMENTS

| | | | |
|---|---|---|---|
| DE | 598960 | C | 6/1934 |
| EP | 1207601 | A2 | 5/2002 |
| FR | 1501532 | A | 11/1967 |
| GB | 1112745 | A | 5/1968 |
| WO | WO 86/04452 | A | 7/1986 |

OTHER PUBLICATIONS

French Preliminary Search Report dated Jun. 25, 2008 for FR 0758996.

*Primary Examiner*—Ramon M Barrera
(74) *Attorney, Agent, or Firm*—Nixon Peabody LLP

(57) ABSTRACT

A switch unit comprising a circuit breaker and a disconnector disposed in one plane and fixed to a metal casing.

Common drive means comprise:

a single insulating drive bar adapted to move in a straight line in the same plane as the plane of straight line movement of the movable contacts of the circuit breaker and disconnector; and at least one mechanical assembly mounted in the metal casing, at least part of the mechanical assembly being driven by the single insulating drive rod while permitting non-simultaneous straight-line movement of the two movable contacts.

17 Claims, 12 Drawing Sheets

FIG. 5A
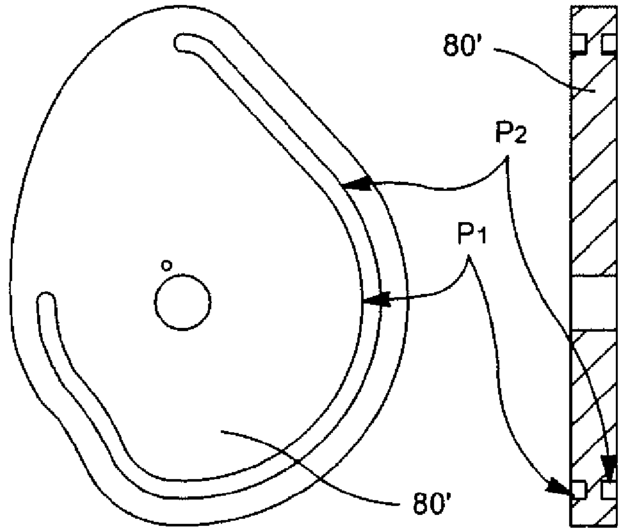
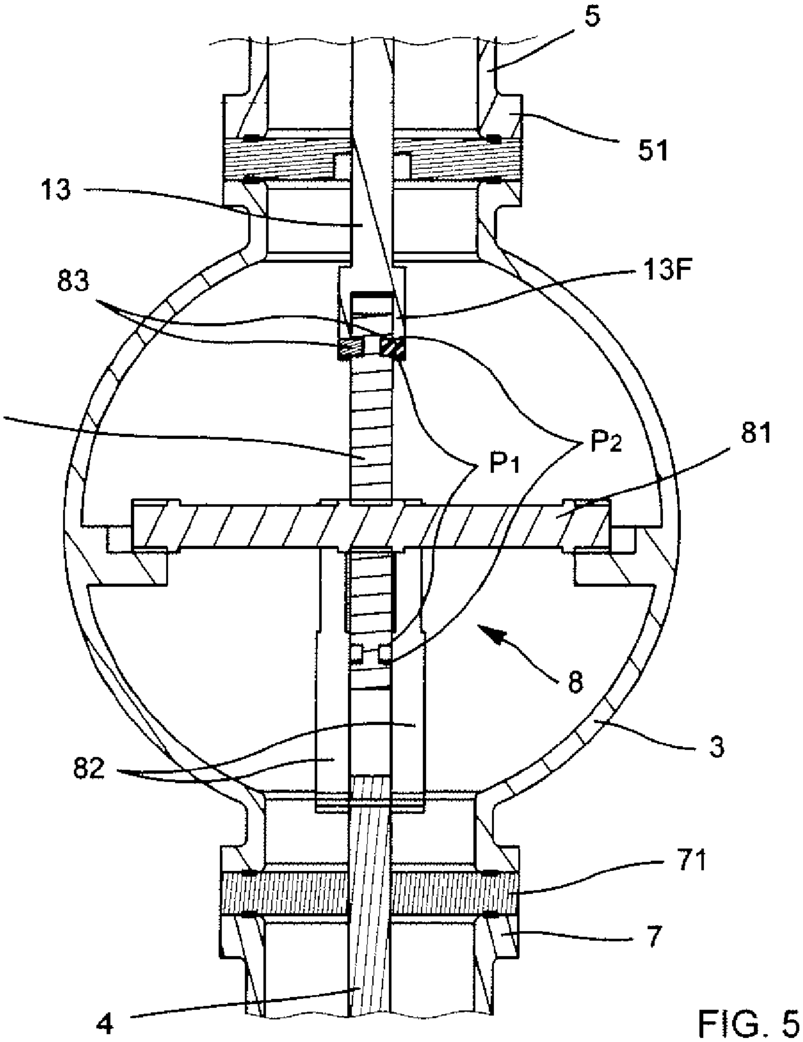
FIG. 5

SWITCH UNIT HAVING A CIRCUIT BREAKER AND A DISCONNECTOR WITH COMMON DRIVE MEANS

CROSS REFERENCE TO RELATED APPLICATIONS OR PRIORITY CLAIM

This application claims priority to French Patent Application No. 07 58996, filed Nov. 13, 2007.

TECHNICAL FIELD

This invention relates to the field of switch units having a circuit breaker and a disconnector that are disposed in one plane.

More specifically, the invention relates to that type of switch unit in which the circuit breaker and disconnector are disposed in one plane and are also fixed to a metal casing, with the circuit breaker and disconnector each comprising a pair of contacts that consist of a fixed contact and a contact that is movable in straight line motion (translation), so that the contacts of the pair become separated from each other during a switching operation.

The main application in practice is that in which the circuit breaker and disconnector are disposed in insulating housings, each of which is filled with a controlled atmosphere of a dielectric gas such as $SF_6$.

PRIOR ART

It is known to use apparatus (switch units) consisting of two switching devices disposed in one plane and fixed to a metal casing, each switching device having a contact that is movable between an open position and a closed position. One of the two switching devices is a circuit breaker having a fixed contact connected to a first terminal of a network, and a second contact that is movable relative to the first contact, the two contacts being disposed along one axis. The second switching device is a disconnector, having a fixed contact, connected to a second terminal of the network, and a movable contact, the two contacts being disposed along another axis.

It is also known to use drive means that are coupled to a motor to enable the movable contacts of the circuit breaker and of the disconnector to be operated, and to cause each movable contact, if desired, to follow a predetermined opening and closing sequence.

Patent Application EP 1 207 601 accordingly proposes that a part of the drive means be arranged in the metal casing to which the circuit breaker and disconnector are fixed, and that they be coupled to another part of the drive means in the form of connecting rods, which are themselves arranged inside a vertical insulating cylinder, with the motor mounted in the base of this cylinder. Such an arrangement offers advantages, in that it enables the apparatus to be compact because the drive means are located inside the metal casing. However, the drive means for the circuit breaker are independent of the drive means for the disconnector.

DISCLOSURE OF THE INVENTION

The object of the invention is accordingly to propose a switch unit of the type specified above, which is compact, and which has drive means that are common to the circuit breaker and the disconnector Another object of the invention is to propose common drive means in which the movable contacts of the circuit breaker and disconnector are able to follow their own displacement profiles relative to time, and in particular so that the disconnector is protected during opening and closing of the circuit breaker.

In particular, in pursuance of a further object of the invention, the invention proposes delayed opening of the disconnector, in relation to the opening of the circuit breaker, and closing of the disconnector in advance of the closing of the circuit breaker so as to return the switching devices to service.

To these ends, the invention accordingly provides a switch unit comprising a circuit breaker and a disconnector disposed in one plane and fixed to a metal casing, the circuit breaker and disconnector each having a pair of contacts that consists of a fixed contact and a contact that is movable in straight line motion whereby to separate the contacts of the pair from each other in a switching operation, the unit further including drive means common to the circuit breaker and disconnector, the drive means comprising:

- a single insulating drive rod adapted for straight line movement in the same plane as the plane in which the said movable contacts are movable; and
- a mechanical assembly mounted in the metal casing and having at least one portion that is driven by the single insulating drive rod while permitting non-simultaneous straight line movement of the two movable contacts.

In a first embodiment of the invention, the said mechanical assembly comprises:

- at least one cam mounted for rotation in the metal casing, the or each cam having an outside profile and/or inside profiles that permit non-simultaneous straight line movement of the two movable contacts in engagement against or in the cam(s); and
- return means disposed in the metal casing and adapted to maintain each of the said movable contacts in engagement against the outside profile and/or in the inside profiles of the cam(s) whatever the rotational position of the cam(s).

Advantageously, the outside and/or inside profile of the or each cam is or are such as to permit, at the same time, the opening of the contacts of the circuit breaker before opening of the contacts of the disconnector, and closing of the contacts of the disconnector before closing of the contacts of the circuit breaker. In this way, the switch unit is returned to service with the aid of the common control means.

Advantageously again, the cam is coupled to the drive rod through a curved connecting rod adapted to permit the cam shaft to be bypassed.

In a modified version, at least one said movable contact includes a push rod having a shoulder at an end of the push rod inside the metal casing, the said return means comprising at least one compression spring, coaxial with the push rod and in engagement, firstly against the said shoulder, and secondly against a portion of the metal casing separating it from the disconnector or circuit breaker, with the said push rod extending through the spring.

In another modified version, at least one said movable contact includes a push rod having at its end a fork inside the metal casing, the said return means comprising at least one follower pin fixed on the inner side of one of the branches of the fork and engaged in a groove formed at the inner periphery of the cam. In this way, the need for a spring to maintain the engagement of the movable contact is eliminated, as is the energy necessary for compressing such a spring while the contacts are being closed.

In one advantageous version of the said first embodiment of the invention, a single cam is mounted for rotation in the metal casing and is driven by the drive rod. This reduces the number of components needed for the common drive, since only one drive rod, and only one cam, are used.

In another embodiment, three cams, two of which have identical outside profiles, are mounted for rotation in the metal casing on the same cam shaft, and a single cam is driven by the drive rod, with at least one movable contact including a push rod having at its end a fork within the metal casing, with each of the branches of the fork being in engagement against a respective one of the two cams having identical outside profiles. The use of three cams, two of which have identical profiles, enables a greater degree of rotation to be effected in opening and closing the contacts.

Preferably, the outside profile of the or each cam includes two continuous curves, such that, when the two movable contacts are in engagement jointly on one of the two curves, only the movable contact of the circuit breaker has a straight line movement, and when the cam has reached a given rotational position, one of the two movable contacts comes into engagement on the other one of the two curves.

Preferably again, when the cam has reached a rotational position more than 90° beyond its initial position in which the two contacts are closed, the movable contact of the circuit breaker is in engagement on one of the said curves, while the movable contact of the disconnector is in engagement on the other one of the said curves.

In another version of this embodiment, at least one movable contact comprises a push rod having an end on which a follower roller is mounted for making rolling contact against the outer profile of the cam(s). In this way the output of the drive means is increased, by reduction of the friction, since the sliding friction of the contact that is in direct engagement against, or in, the cam is replaced by the rolling friction of the roller against the outside profile of the cam(s).

In a second embodiment of the invention, the said mechanical assembly comprises:

- four links of equal length, articulated together to form a lozenge, one of the pivot points of the lozenge being fixed to the movable contact of the circuit breaker;
- an actuating rod having one end fixed to the insulating drive rod and another end fixed to the pivot point of the lozenge opposite the pivot point that is fixed to the movable contact of the circuit breaker;
- coupling means coupling together the movable contact of the disconnector and the said actuating rod; and
- lozenge shape varying means, for causing the shape of the lozenge to vary while it is being driven by the insulating drive rod, the said lozenge, drive rod, and lozenge shape varying means being so arranged relative to each other as to permit non-simultaneous straight line movement of the pivot point of the lozenge that is fixed to the movable contact of the circuit breaker and of the movable contact of the disconnector coupled with the said actuating rod.

The solution in this second embodiment minimizes the energy expended in operation.

In a modified version, the said coupling means comprise a coupling groove in fixed relation with the actuating rod and having a non-straight profile, and a coupling roller fixed to the movable contact of the disconnector and engaged in the coupling groove of the actuating rod, the coupling groove being arranged to enable the coupling roller to slide in the coupling groove during the whole stroke of the drive rod, but to enable the roller to move in a straight line during only a portion of the said stroke.

In order to permit opening of the contacts of the circuit breaker before opening of the contacts of the disconnector and, at the same time, closing of the contacts of the disconnector before closing of the contacts of the circuit breaker, the articulated lozenge and the actuating rod are so arranged in relation to each other that:

- over a first stroke of straight movement, the lozenge is displaced in the same direction as the drive rod, while keeping its shape identical, and the coupling roller slides in the coupling groove without there being any straight line movement of the movable contact of the disconnector; and
- over a second stroke of straight movement of the drive rod, being a continuation of the said first stroke, the pivot point of the lozenge that is fixed to the movable contact of the circuit breaker remains stationary, while its shape changes and the coupling roller slides in the coupling groove, with the moving contact of the disconnector moving in a straight line.

In a further modified version, the said coupling means comprise:

- a guide pin fixed on the actuating rod;
- a coupling lever mounted for rotation in the metal casing and formed with a slot having a non-straight profile, in which the guide pin fixed on the actuating rod is engaged;
- a connecting link articulated between the coupling lever and the movable contact of the disconnector, with the guide pin, coupling lever and connecting link being so arranged in relation to each other as to permit the guide pin to slide in the slot during the whole stroke of the drive rod, but to permit the lever to pivot during only a portion of the said stroke. A roller may be mounted on the guide pin whereby to provide rolling coupling.

In yet another version, the said lozenge shape varying means comprise:

- two non-straight guide grooves, each consisting of a straight first portion and a straight second portion continuous with the said straight first portion, the said grooves being so arranged in relation to each other that the straight first portions are parallel to each other and the straight second portions are convergent with each other; and
- two guide rollers, each of which is fixed at a further pivot point of the lozenge, the said further pivot point not being itself fixed relative to the movable contacts of the circuit breaker and disconnector, each said guide roller being adapted to be mounted in a respective one of the two non-straight guide grooves, the lozenge, and the guide grooves being arranged in relation to each other in such a way that:
- during the first stroke of straight movement of the drive rod, each guide roller slides in the straight first portion of the corresponding guide groove so as to keep the shape of the lozenge unchanging; and
- during the second stroke of straight movement of the drive rod, continuous with the said first stroke, each guide roller slides in the straight second portion of the corresponding guide groove, thereby causing the shape of the lozenge to change.

In a still further version, the lozenge shape varying means for the lozenge comprise:

- a wall fixed inside the metal casing;
- a hollow bar having one end fixed to the movable contact of the circuit breaker, with its other end being formed at its periphery with open holes, in which balls are mounted, its shape being adapted so that it is surrounded by the fixed wall;
- a bar having one end that is fixed to the actuating rod, with its other end being formed with spherical bowl-shaped cavities and being of a shape adapted so that it is partly embedded in the hollow bar;

two straight guide grooves, convergent towards each other; and two guide rollers, each of which is fixed to a further pivot point of the lozenge, the said further pivot point not being itself fixed relative to the movable contacts of the circuit breaker and disconnector, each guide roller being adapted to be mounted in one of the two guide grooves, with the lozenge, the fixed wall, the bars and the guide grooves being arranged in relation to each other in such a way that:

during the first stroke in the straight movement of the drive rod, the bars are fastened together by virtue of the lateral blocking of the balls firstly by the fixed wall, and secondly by the spherical bowls, so as to keep the shape of the lozenge unchanged; and at the start of the second stroke in the straight movement of the drive rod, continuous with the said first stroke, the bars are unfastened from each other by lateral release of the balls on the side of the fixed wall, and at the end of the said second stroke, each guide roller slides in the corresponding straight, convergent guide groove, thereby causing the shape of the lozenge to change.

BRIEF DESCRIPTION OF THE DRAWINGS

The features and advantages of the invention can be understood more clearly on a reading of the following detailed description, which is given by way of example only and with reference to the accompanying drawings.

FIG. 5 is a section view of another modified version of the drive means in a switch unit in accordance with the first embodiment of the invention.

FIG. 5A is a detail view showing a modified version of part of the drive means in a switch unit according to FIG. 5.

DETAILED DESCRIPTION OF PARTICULAR EMBODIMENTS

The drawings show a switch unit (apparatus) A in accordance with the invention, which carries out single-pole switching operations. It goes without saying that the arrangement of a switch unit to be described below may be repeated for each pole of a multi-pole combination.

Figure 1:
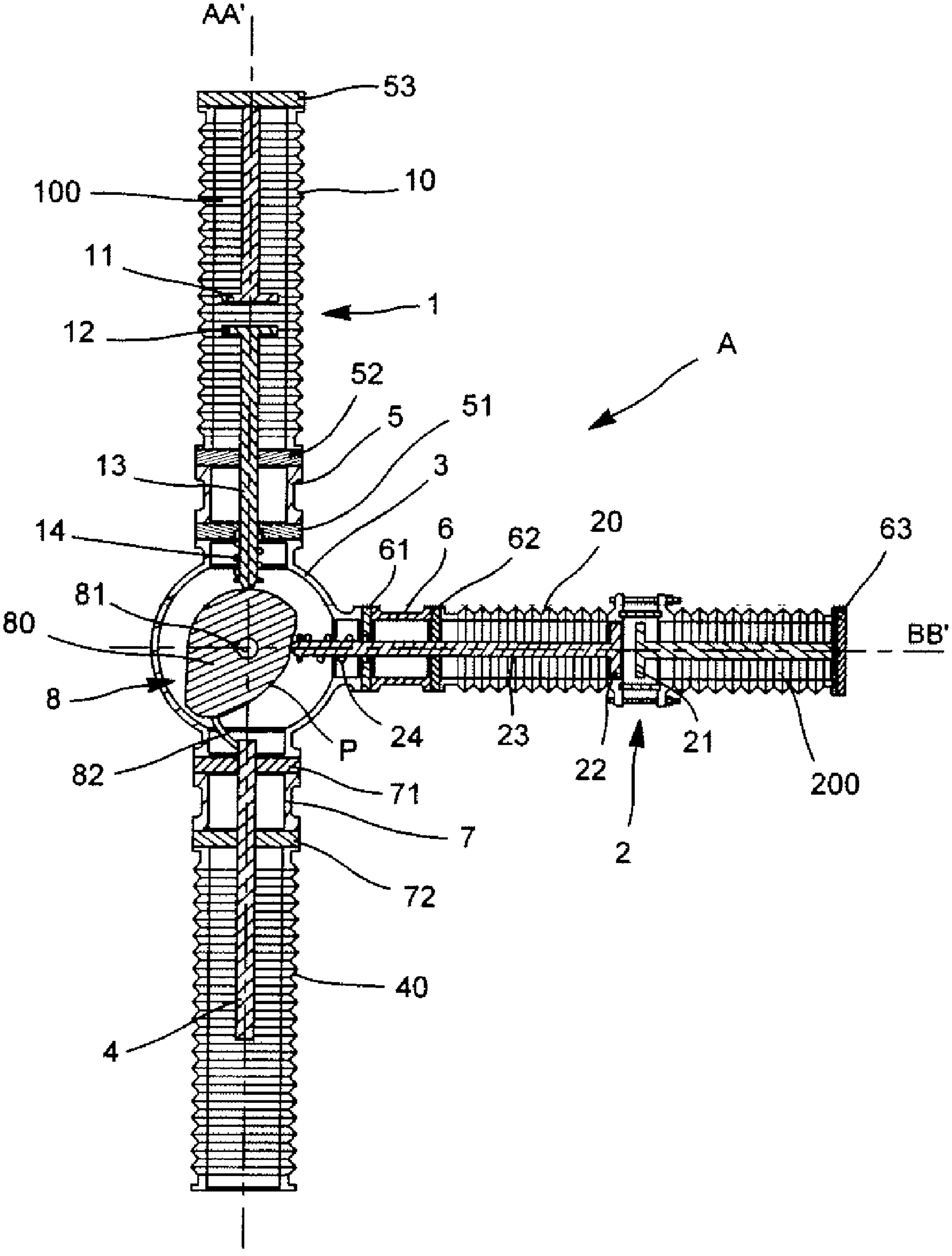
FIG. 1 is a section view of a switch unit in accordance with a first embodiment of the invention.

As shown in simplified form in FIG. 1, the switch unit A comprises a circuit breaker 1 and a disconnector 2 that are coplanar. The circuit breaker 1 and disconnector 2 are fixed to a metal casing or vessel 3, which in the present example is filled with air. The circuit breaker 1 is disposed in an insulating cylinder 10. The disconnector 2 is similarly arranged in an insulating cylinder 20, and the drive rod 4 is disposed in an insulating cylinder 40. In the two embodiments shown, the insulating cylinders 10, 20 and 40 constitute a common enclosed space and are filled with a gas having a high dielectric stiffness. The nature and pressure of the gas are therefore the same inside all three of these cylinders.

The insulating cylinder 10 of the circuit breaker 1 is mounted on the metal casing 30 in the following way: the casing 3 is attached, through a metal cover plate 51, to a sleeve piece 5, which is itself attached through a metal cover plate 52 to the cylinder 10 of the circuit breaker 1, which is in turn connected to a first terminal 53 of the network.

The insulating cylinder 20 of the disconnector is mounted on the metal casing in a similar way: the casing 3 is attached through a metal cover plate 61 to a sleeve piece 6, which is attached through a metal cover plate 62 to the cylinder 20 of the disconnector 2, which is itself connected to a second network terminal 63.

Finally, the insulating cylinder 40 for the insulating drive rod 4 is mounted in a similar way on the casing 3: the casing 3 is attached, through a metal cover plate 71, to a sleeve piece 7 that is itself attached through a metal cover plate 72 to the cylinder 40 of the drive rod 4.

There is a current breaking chamber 100 inside the cylinder 10 of the circuit breaker. The said breaking chamber 100 includes a first fixed contact 11 connected to the terminal 53 of the network, and a second contact 12 that is movable longitudinally, along a first axis AA', relative to the first contact 11. The said current breaking chamber 100 is electrically connected in series with the disconnector 2 through the metal casing 3.

The disconnector 2 also has a current breaking chamber, 200, that is inside its insulating cylinder 20. The breaking chamber 200 includes a first fixed contact 21 connected to the terminal 63 of the network, together with a second contact 22 that is movable longitudinally on a second axis BB' relative to the first contact 21.

The two axes AA' and BB' are preferably at a right angle to each other. Each of the movable contacts 12 and 22 is terminated by a longitudinal push rod 13, 23 respectively (see FIG. 1).

The push rods 13 and 23 are lengthwise extensions of the movable contacts 12 and 22, and are coupled to a mechanical assembly 8 that is part of the drive means.

This mechanical assembly 8 of the common drive means is able to be operated from outside the casing 3 by means of longitudinal movement of the insulating rod 4 in a straight line along the axis AA'. The longitudinal displacement of the drive rod 4 along the axis AA' is converted into rotation of a cam shaft 81.

To explain further, a connecting rod 82 is rotatably coupled for pivoting movement, firstly to a cam 80 that is itself secured on the cam shaft 81, and secondly to the drive rod 4. The connecting rod 82 is circular in shape so that it does not make contact with the cam shaft 81, and it thus ensures alignment of the axis of movement of the rod 4 with the axis AA' of the movement of the contact 11 of the circuit breaker 1.

Figure 1A:
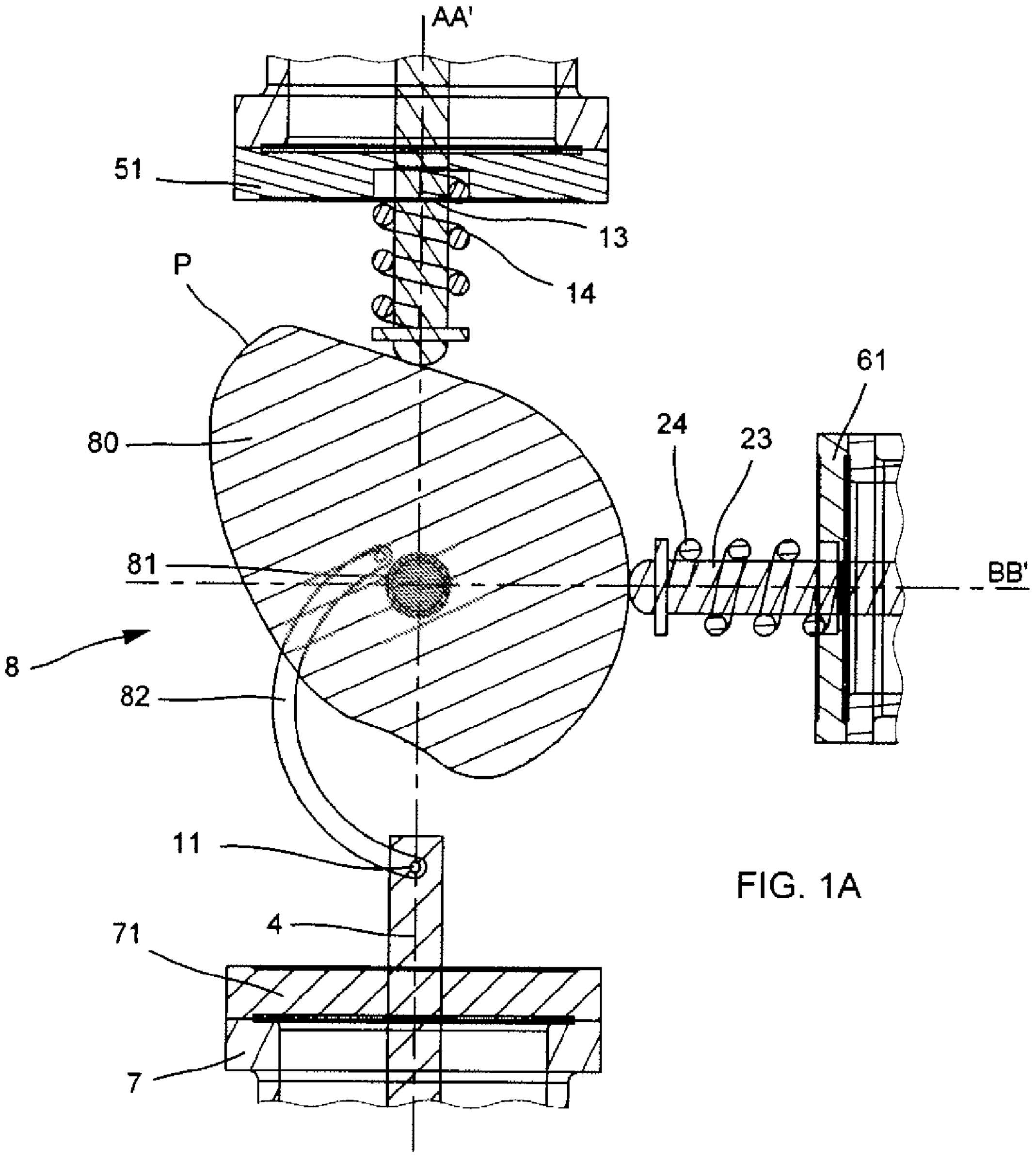
FIG. 1A is a detail view showing the interior of the metal casing in which part of the drive means of the switch unit shown in FIG. 1 are arranged.

When the cam 80 is rotating, it transmits a longitudinal displacement of the push rods 13 and 23, which are held in contact with the outside profile of the cam 80 by springs 14 and 24 respectively (see FIG. 1A).

The cam 80, having an external cam profile, therefore exerts a thrust force on the push rods 13 and 23, and therefore causes the pairs of contacts 11, 12, and 21, 22 respectively to be closed along the axes AA' and BB'.

As to the springs 14 and 24, these exert a thrust force for opening the pairs of contacts 11, 12 and 21, 22, which, being opposed to the force exerted by the external cam profile of the cam 80, takes the form of a pulling force exerted on the rods 13 and 23, still on the same axes AA' and BB'.

Figure 2:
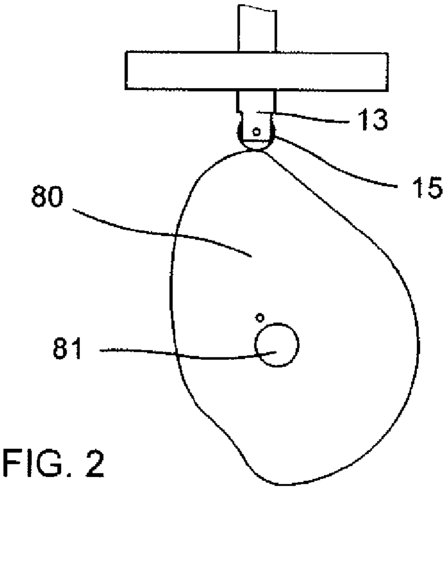
FIG. 2 is a detail view showing a modified version of a part of the drive means in a switch unit in accordance with said first embodiment of the invention.

The movement between the cam 80 and the rods 13 and 23 is transmitted either by direct contact, that is to say by friction (see FIGS. 1 and 1A), or by indirect contact through a roller 130 that is mounted on the end of the rod 13 (see FIG. 2). The direct contact gives rise to a reaction torque on the cam 80 due to friction, and thus involves a loss of energy that is dissipated in the form of heat in the two components 13 or 23 and 80 in contact with each other, and also the use of a follower roller 15 enables the power to be increased by reducing friction, substituting rolling friction for sliding friction.

Figure 6:
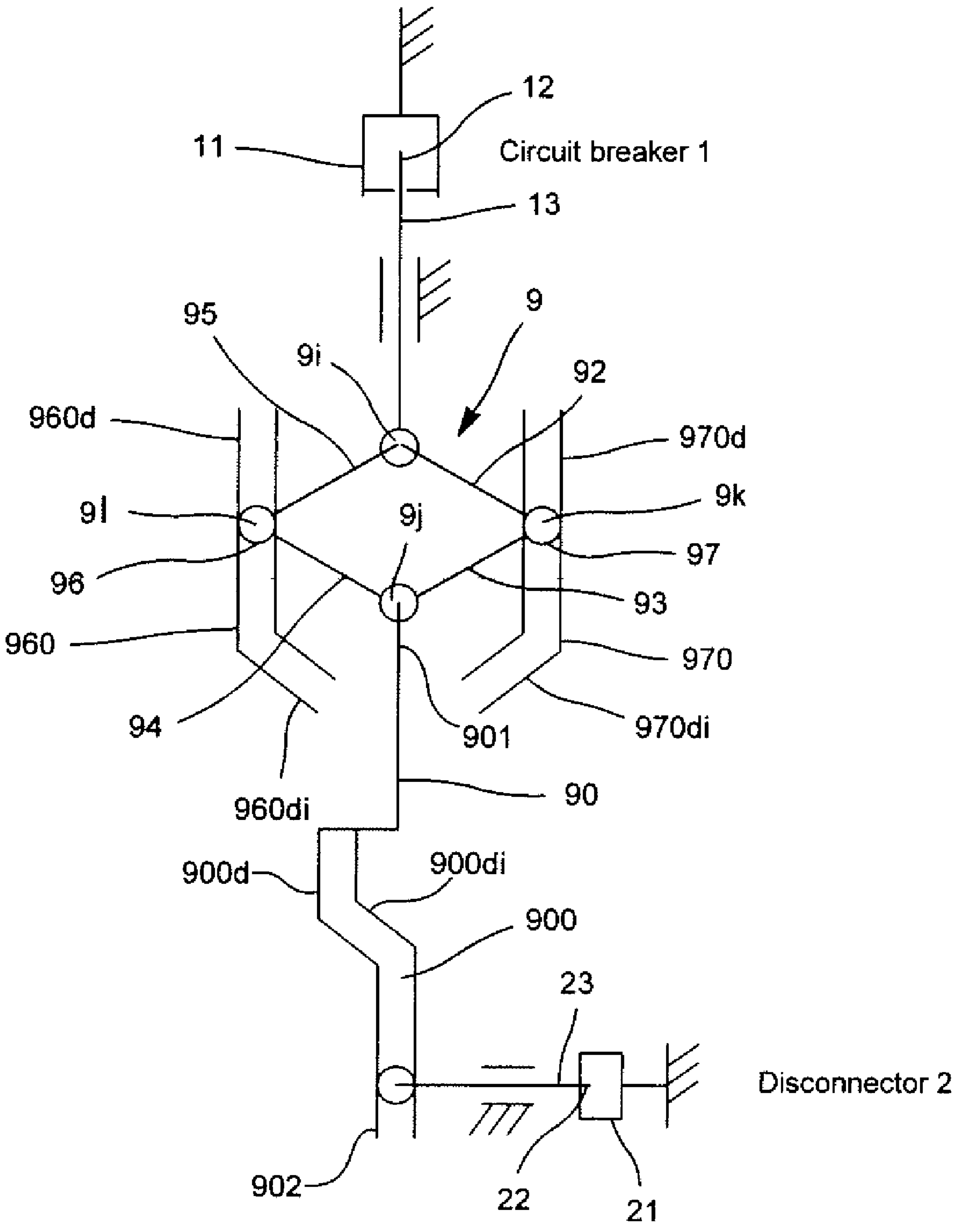
FIG. 6 is a diagrammatic front view of a switch unit in accordance with a second embodiment of the invention.

The internal profiles P1 and P2 (FIG. 5A) or the external profile P (FIG. 1A) of the cam 80 determine the movement of the rods 13 and 23 in longitudinal straight line motion, and their lift, and also the opening time (see the time diagram in FIG. 6).

In order to optimize the operation of the circuit breaker 1, the motion of the movable contact 12 preferably follows a time diagram such as that shown in FIG. 6.

During the initial period, to the instant t0, of activating the control process for interrupting the current, the driving of the insulating rod 4 in a straight stroke along the axis AA' causes rotation of the cam 80 about the axis of the shaft 81, at a right angle both to the axis AA; and to the axis BB'.

Figure 3A:
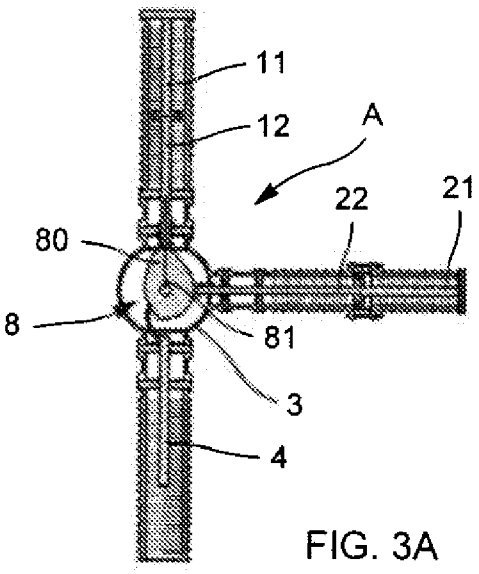
FIGS. 3A to 3D are views in cross section, showing the various positions that are obtained in an opening sequence of a switching operation, under drive from the drive means in a switch unit according to FIG. 1.
Figure 3B:
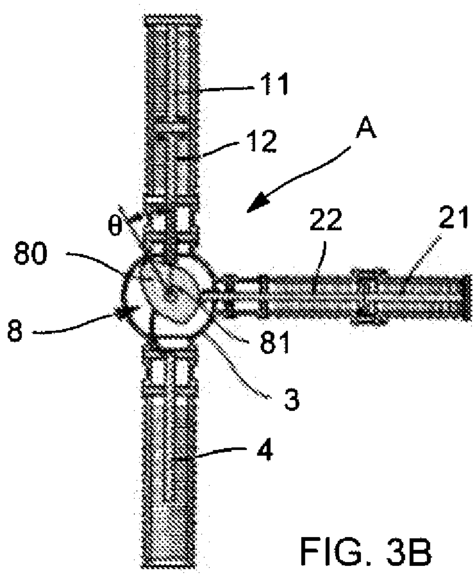

The rotation of the cam 80 displaces the push rod 13 in a straight stroke on the axis AA', until the contacts 11 and 12 of the circuit breaker 1 are fully open (see FIGS. 3A and 3B). The first part of the rotation θ causes separation of the contacts 11 and 12 at the end of the period to the instant t1. During this rotation, the push rod 23, being coupled to the disconnector, is in contact with a portion of the profile of the cam 80 that defines an arc of a circle centered on the axis of the cam shaft 81, thus leaving the disconnector in a closed sate.

In addition, in order not to subject the disconnector 2 to stresses other than those applied during normal operation in an electrical network, the drive means 4, 8, 80, 81, 82 enable the contacts 21 and 22 of the disconnector 2 to be opened after the circuit breaker 1 has opened fully, by leaving an idle time between full opening of its contacts and the start of the movement of the disconnector 2.

A complementary rotation through an angle θ1 (see FIG. 3C), during which the push rods 13 and 23 both remain in contact with an arcuate profile of the cam 80 centered on the axis of the cam shaft 81, enables the circuit breaker 1 to remain open, and the disconnector to remain closed.

Figure 3C:
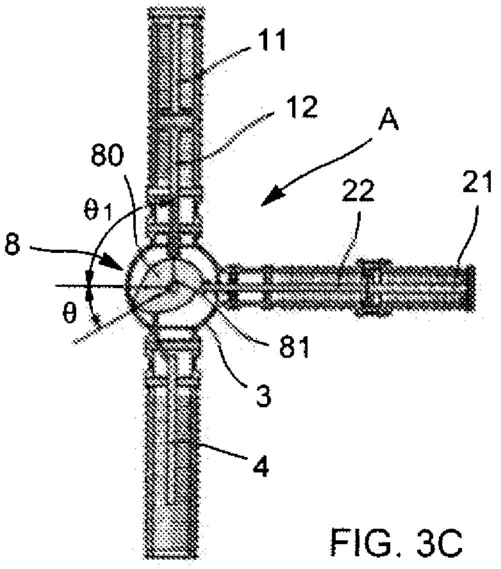
Figure 3D:
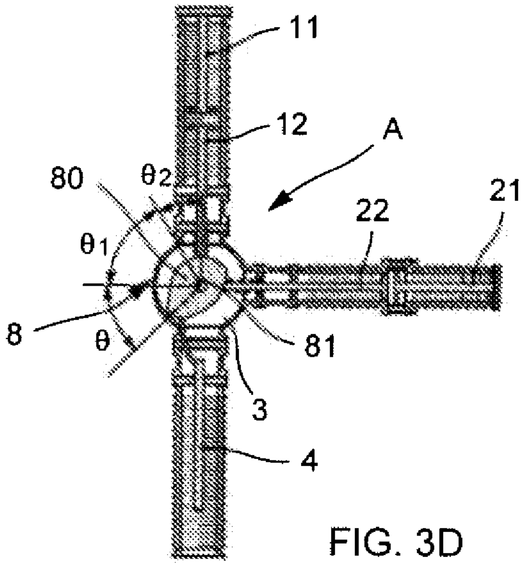

Opening of the disconnector is effected by continuing the rotation of the cam 80 through a complementary angle θ2 (see FIG. 3D). During this rotation, the push rod 13 remains in contact with an arcuate profile of the cam 80 centered on the axis of the cam shaft 81, which leaves the circuit breaker 1 in its open position, and the push rod 23 follows a matching profile that causes progressive opening of the disconnector until the contacts 21 and 22 are open at the end of the period to the instant t3, and until it is put into the open position when the rotation finishes at the end of the period to the instant t4.

In a similar way, when the distribution network is being returned to service, and therefore during closing of the contacts 11, 12 and 21, 22, the stroke of the drive rod 4 in the reverse direction to the first, rotates the cam 80 in the reverse direction to its first direction of rotation.

The rotation of the cam 80 through an angle θ2 drives the push rod 23 in a straight stroke along the axis BB', until the contacts 21 and 22 of the disconnector 2 are fully open. Further rotation of the cam 80 then takes place, through an angle θ1 that leaves the disconnector 2 in its closed position and the circuit breaker 1 in its open position. The complementary rotation of the cam 80 through the angle θ ensures complete closing of the circuit breaker 1.

In a modified version of the first embodiment of the invention, shown in FIGS. 1, 1A, 2 and 3A to 3D, a single cam 80 governs the patter of operation of the push rods 13 and 23, and therefore that of the pairs of contacts 11, 12 and 21, 22.

The cam 80 accordingly has a particular outside profile P for permitting opening of the contacts 11 and 12 of the circuit breaker 1 over θ° of rotation, by a thrust exerted by the spring 14 on the push rod 13, while the push rod 23 is at rest and the contacts 21 and 22 therefore stay closed (see FIGS. 3A and 3B).

Then, over θ1° of additional rotation of the cam 80, the push rods 13 and 23 are both at rest, leaving the contacts 11 and 12 of the circuit breaker open and the contacts 21 and 22 of the disconnector closed (see FIG. 3C).

Finally, over θ2° of further additional rotation of the cam 80, the push rod 13 remains at rest, leaving the contacts 11 and 12 of the circuit breaker open, while the disconnector contacts 21 and 22 are opened by the force applied by the spring 24 on the push rod 23 (see FIG. 3D).

Opening of the contacts 11 and 12, and the opening of the contacts 21 and 22, therefore take place, in the embodiment shown in FIGS. 1, 1A and 2 and FIGS. 3A to 3D, over (θ+θ1+θ2)° of rotation of the cam 80.

Closing of the pairs of contacts 11, 12 and 21, 22 is obtained, in a similar way over θ2° of reverse rotation of the cam 80, with the outside profile of the said cam 80 exerting a thrust on the push rod 23, so compressing the spring 24 and, at the same time, closing the contacts 21 and 22 of the disconnector 2, while the push rod 13 stays at rest, leaving the contacts 11 and 12 of the circuit breaker 1 open.

Over θ1° of reverse rotation of the cam 80, the push rods 13 and 23 remain at rest, leaving the contacts 21 and 22 of the disconnector 2 closed and the contacts 11 and 12 of the circuit breaker 1 open.

Finally, over θ° of reverse rotation of the cam 80, the push rod 23 stays at rest, leaving the contacts 21 and 22 of the disconnector 2 closed, while the outside profile of the cam exerts a thrust on the push rod 13, so compressing the spring 14 while closing the contacts 11 and 12 of the circuit breaker 1.

Closing of the contacts 11, 12 and 21, 22 then itself takes place over (θ+θ1+θ2)° of reverse rotation of the cam 80.

In another version of the first embodiment of the invention, shown in FIGS. 5 and 5A, it is possible to make use of only one particular cam 80' with a double internal profile P1, P2.

In this version, it is not only the need for the springs 13 and 24 for holding the push rods 13 and 24 in engagement with the cam 80 that is eliminated, but so also is the energy needed to compress those springs during closing of the pairs of contacts 11, 12 and 21, 22.

As to that, this cam 80 not only has an internal cam profile P1 for exerting a thrust force during closing of the pairs of contacts 11, 12 and 21, 22, but it also has another internal cam profile P2 that is homothetic (meaning that it is formed facing, and at a constant distance away) relative to the cam profile P1, the cam profile P2 exerting a pulling force while the pairs of contacts 11, 12 and 21, 22 are being opened. In this embodiment, the push rods 13 and 23 therefore have a common geometrical characteristic, namely that the end of the push rod that is in contact with the cam 80' is in the form of a fork (see the reference numeral 13F for the fork on the push rod 13 in FIG. 5), so as to be coupled to the cam through a follower pin 83, which is guided between the inside cam profile P1 and the inside cam profile P2.

In this version of the first embodiment of the invention (FIGS. 5 and 5A), the straight line motion between the cam 80' and the push rods 13 and 23 is therefore obtained through frictional engagement of the follower pin 83 between the cam profiles P1 and P2. The nature of this engagement is therefore the most important factor in the performance of this mechanism.

Figure 4:
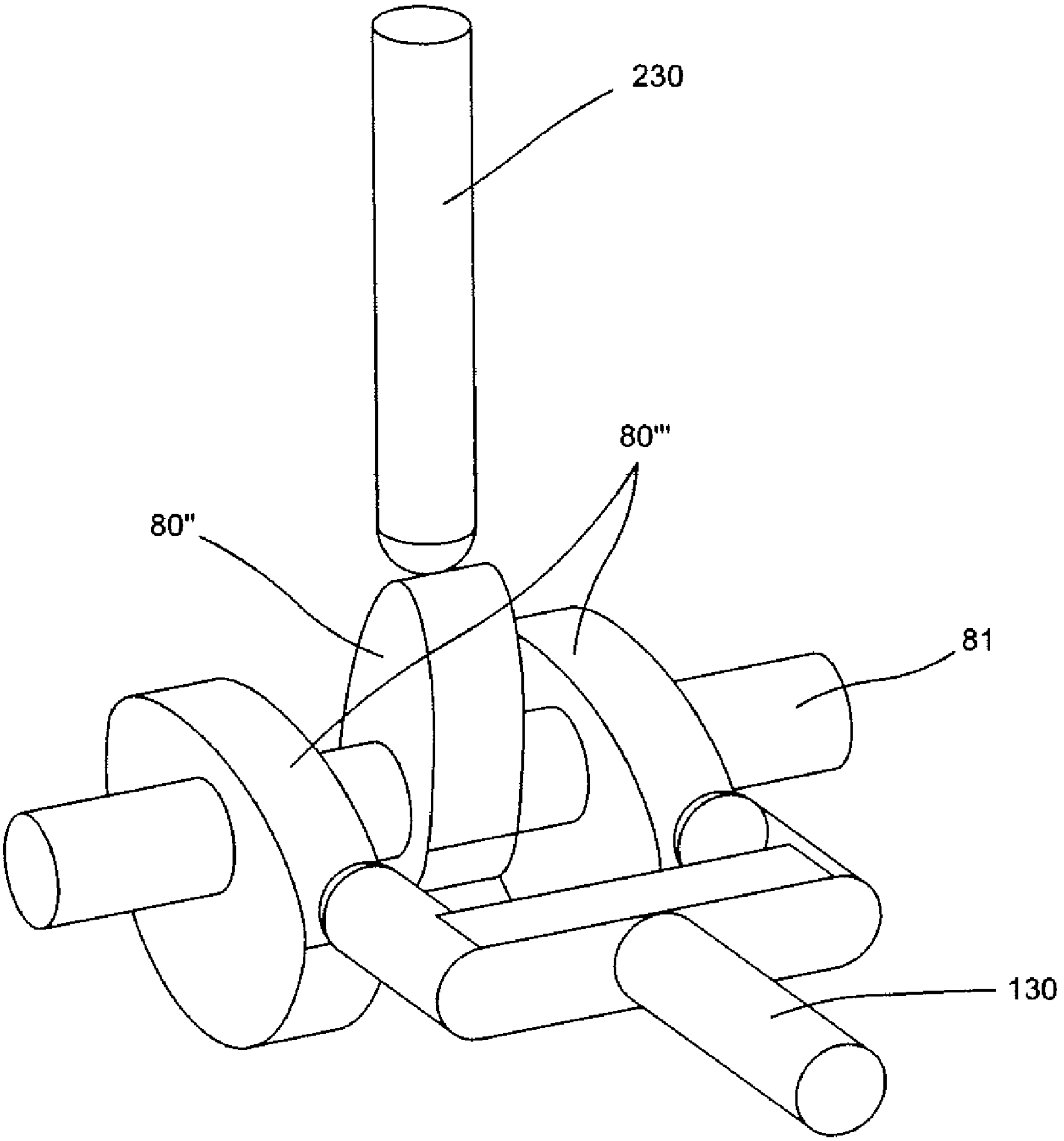
FIG. 4 is a diagrammatic perspective view of a modified version of the drive means in a switch unit in accordance with the first embodiment of the invention.

In another modified version of this first embodiment of the invention, two types of cam 80" and 80'", fixed on a common cam shaft 81 defining their axis of rotation, as shown diagrammatically in FIG. 4, control the pattern of operation of the push rods 13 and 23.

A first type of cam 80" controls the pattern of operation of the push rod 23 and therefore of the contacts 21 and 22, while a second type of cam 80'" controls the pattern of operation of the push rod 13 and therefore of the contacts 11 and 12. For this purpose, two cams 80'" of this second type, fitted on either side of the cam 80" of the first type, are in engagement with a follower 130 that is fixed to the push rod 13 and that is in the form of a fork for straight movement along the axis AA'; while the cam 80" of the first type is in engagement with a follower rod 230 that is fixed to the push rod 23 for straight movement on the axis BB'. Having regard to the forces that are needed, it is preferable to use the two cams 80'" for operation of the circuit breaker 1, and the cam 80" for the disconnector.

The cam profile of each cam 80'" is determined in such a way that it causes the circuit breaker 1 to open through an angle of rotation θ. The circuit breaker 1 stays in the open position over the complementary rotation θ1 followed by θ2.

The cam 80" has a profile that is determined in such a way as to hold the disconnector in its closed position during the rotation θ, and then, over the rotation θ1, to open the contacts 21 and 22 of the disconnector 2 over a complementary rotation θ2.

The two types of cam 80" and 80'" are assembled on the same cam shaft 81. Rotation in the reverse direction causes the disconnector be closed, followed by closing of the circuit breaker 1.

The second embodiment of the invention shown in FIGS. 6 to 9 is described below.

In the interests of clarity, the circuit breaker and disconnector and their associated contacts carry the same reference numerals as in the first embodiment.

The second embodiment is based on the use of a deformable lozenge 9 and an actuating rod 90, which is fixed to the drive rod 4 and coupled to the movable contact 22 of the disconnector 2.

This mechanical assembly (consisting of the deformable lozenge 9 and actuating rod 90) transmits the movement of the drive rod 4 to the circuit breaker 1. The lozenge 9 accordingly retains a fixed shape over the whole operation of opening the circuit breaker (see FIGS. 7A and 7B), but then it changes shape so that, over the rest of the driving operation, the circuit breaker 1 stays in a fully open position (see FIGS. 7C and 7D), and thereby enables the disconnector 2 to be opened (FIG. 7D).

The mechanical assembly comprises, first of all, a lozenge 9 consisting of four links 92, 93, 94 and 95, all of the same length and articulated together. On the pivot points, 9*i*, is coupled to a push rod 13 that is fixed to the movable contact 12 of the circuit breaker 1. The pivot point 9*j* opposite to the point 9*i* is coupled to one end 901 of the actuating rod 90, the other end 902 of which is coupled directly to the drive rod 4. Guide rollers 96 and 97 are mounted at each of the other two pivot points 9*k* and 9*l* of the lozenge 9. The articulated joints between the links 92, 93, 94 and 95 and the pivot points 9*i*, 9*j*, 9*k* and 9*l* of the lozenge 9 enable displacement in rotation to take place.

The mechanical assembly also includes two identical guide grooves 960 and 970, formed on the inside of the metal casing (which is not shown but which is similar to the metal casing 3).

The actuating rod 90 is formed with a coupling groove 900, the profile of which is non-straight, changing at a particular height along the rod 90.

A coupling roller 98 is mounted in the groove 900 of the rod 90, in which it rolls. The coupling roller 98 is mounted at the end of a push rod 23 that is fixed relative to the movable contact 22 of the disconnector.

Figures 7A, 7B, 7C:
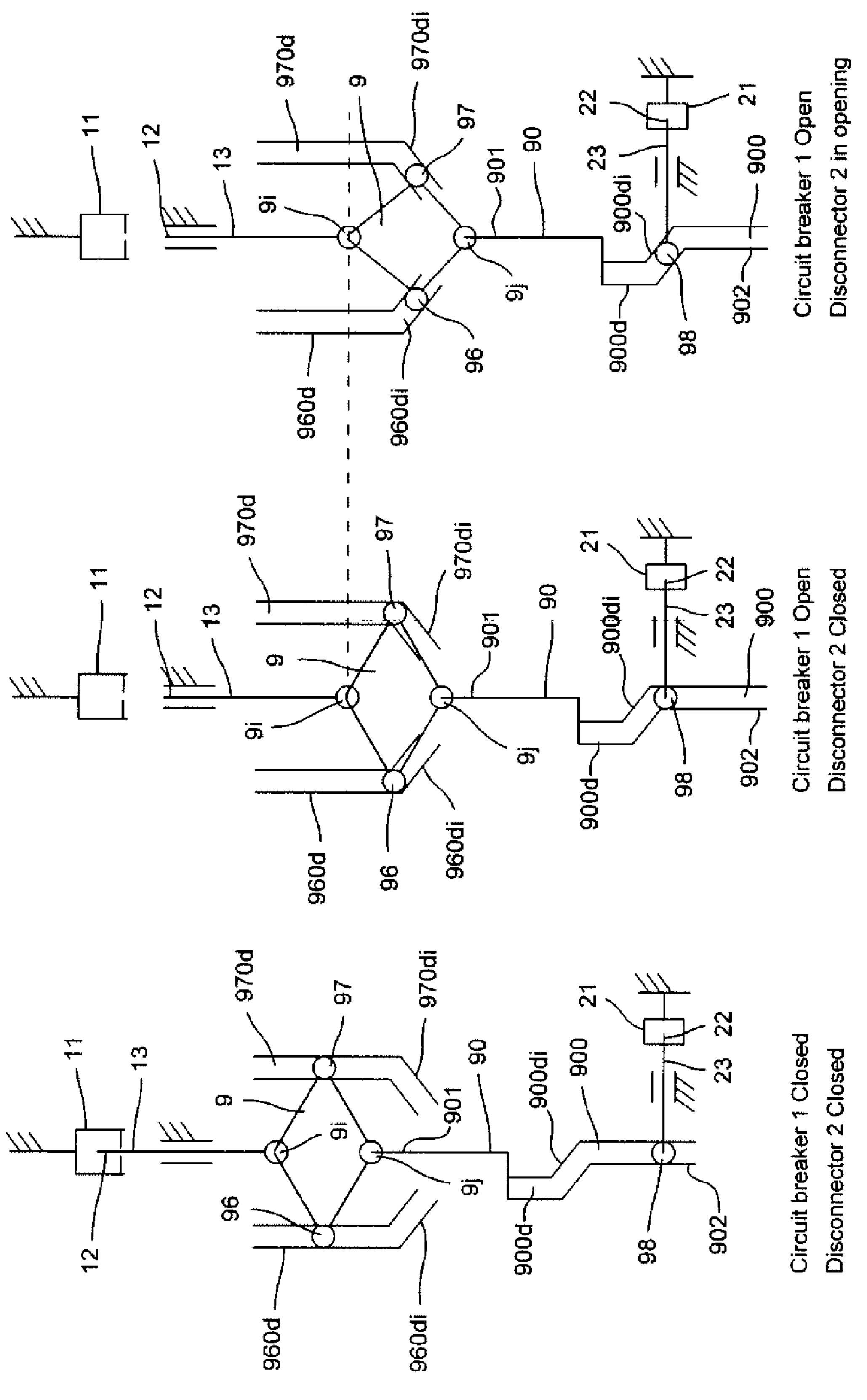
FIGS. 7A to 7D are section views showing the various positions obtained during an opening sequence of a switching operation, under drive from the drive means of a switch unit according to FIG. 6.
Figure 7D:
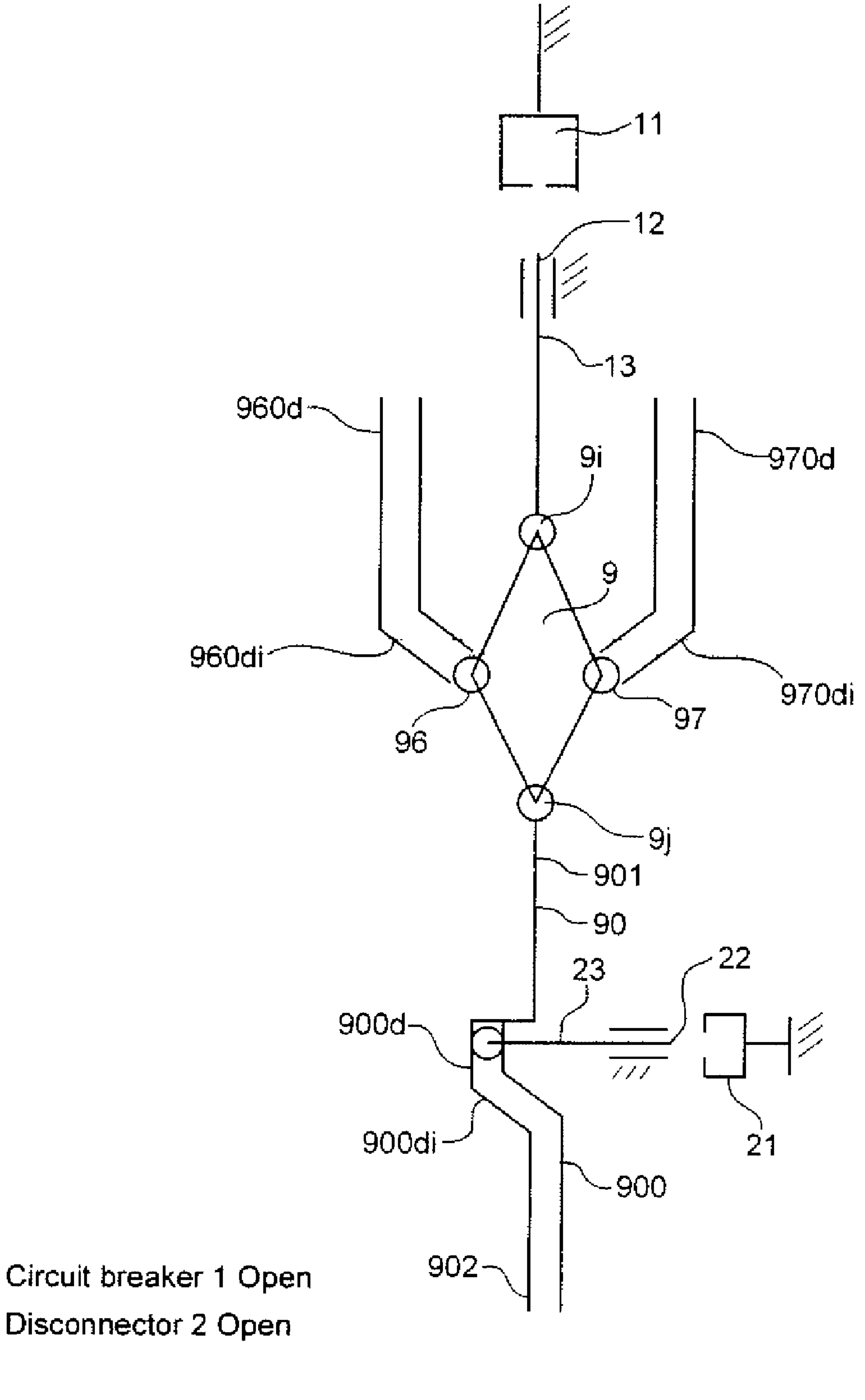

During the opening operation, in the first stage of the operation, the circuit breaker 1 and disconnector 2 are in their closed position (see FIG. 7A). By actuating the single insulating drive rod 4, that is to say by displacing it vertically downwards, the actuating rod 90 descends, and the coupling roller 98 stays on a straight portion of the groove 900, thus leaving the disconnector in its closed position The actuating rod 90 drives the lozenge 9 downwards (see FIG. 7B).

The non-straight guide grooves 960 and 970 are arranged relative to each other with their straight portions 960*d* and 970*d* parallel. Because of this arrangement, the distance between the rollers 96 and 97 is constants and the lozenge 9 remains undeformable throughout this first stage of operation (FIG. 7A). In other words, the displacement of the bottom pivot point 9*j* is identical to that of the top pivot point 9*i* of the lozenge 9. The push rod 13 of the movable contact 12 of the circuit breaker 1 therefore undergoes a displacement that, due to the rigid structure of the undeformable lozenge 9, is identical with that of the actuating rod 90.

The movement is continued until the circuit breaker 1 is in its fully open state (see FIG. 7B). At that moment, each of the guide rollers 96 and 97 is in a zone of the associated guide groove 960 or 970 in which it changes orientation, so that they assume an angle of convergence between them, this being typically of the order of 45°. At this moment too, the coupling roller 98 is once more in contact with the lower straight portion of the profile of the groove 900.

The drive rod 4 then continues to move downwards, which causes the lozenge 9 to be deformed (changed in shape) by the rollers 96 and 97, as these rollers move closer to each other in their sliding movement along straight portions of the grooves 960*di*, 970*di* respectively, since these portions of the grooves are inclined and therefore convergent. The angle of inclination α of the inclined portions 960*di* and 970*di* is advantageously so computed that the top pivot point 9*i* remains in a fixed position, while the bottom pivot point 9*j* continues to move down. The contacts 11 and 12 of the circuit breaker 1 therefore remain open (see FIG. 7C).

Immediately after the guide rollers 96 and 97 have come towards each other, which is typically in a time of the order of 10 ms, the coupling roller 98 follows the inclined straight profile 900*di* of the groove 900, which enables the contacts 21 and 22 of the disconnector 2 to open progressively without the contacts 11 and 12 of the circuit breaker 1 being displaced (see FIGS. 7C and 7C). At the end of the movement of the drive rod 4, the disconnector 2 and circuit breaker 1 are both open (see FIG. 7D).

The various steps of the closing operation take place in reverse order. The disconnector is first closed (see FIG. 7C), and then, when the disconnector has been closed (see FIG. 7B), the drive rod 4 performs its stroke so as to close the circuit breaker (see FIG. 7A).

The change of direction of the guide grooves 960 and 970, from the vertical position 960*d*, 970*d* to the inclined, convergent position 960*di*, 970*di*, which is typically done through an angle of 45° relative to the portions 906*d* and 970*d*, may with advantage be obtained progressively, so that the displacement at the end of the opening movement of the circuit breaker 1 is sufficiently damped. That being so, n the construction of the guide grooves 960 and 970, it may be that the change of direction also involves a slight rebound of the contacts 11 and 12 of the circuit breaker 1 at the end of the movement, this being of the order of a few millimeters (though less than 10 mm), but this rebound nevertheless remains compatible with the performance of the circuit breaker 1, both in terms of current breaking and of dielectric strength.

In the above description, the coupling roller 98 is directly coupled to the push rod 23 of the disconnector, and it therefore performs an identical movement during opening and closing of the disconnector 2. The stroke length of this movement is given by a combination of the stroke of the actuating rod 90 and the slope of the groove 900 (that is to say the angle between the portion 900*d* and the inclined portion 900*di*).

In order to reduce the amount of movement needed for opening the disconnector 2, it is possible, and of advantage, to replace the roller 98, in its fixed position on the push rod 23 of the movable contact 22 of the disconnector 2 and the groove 900 formed in the actuating rod 90 in which it slides.

This replacement consists in providing a guide pin 98' that is fixed to the actuating rod 90, and a coupling lever 99' that is mounted for rotation about a fixed point 30 of the metal casing, and that is articulated, by means of a connecting link 99", to the movable push rod 23 of the disconnector 2; all of this is illustrated in FIG. 8.

The rotatably mounted lever 99' has a slot 990', in which the pin 98' is mounted.

Figure 8A:
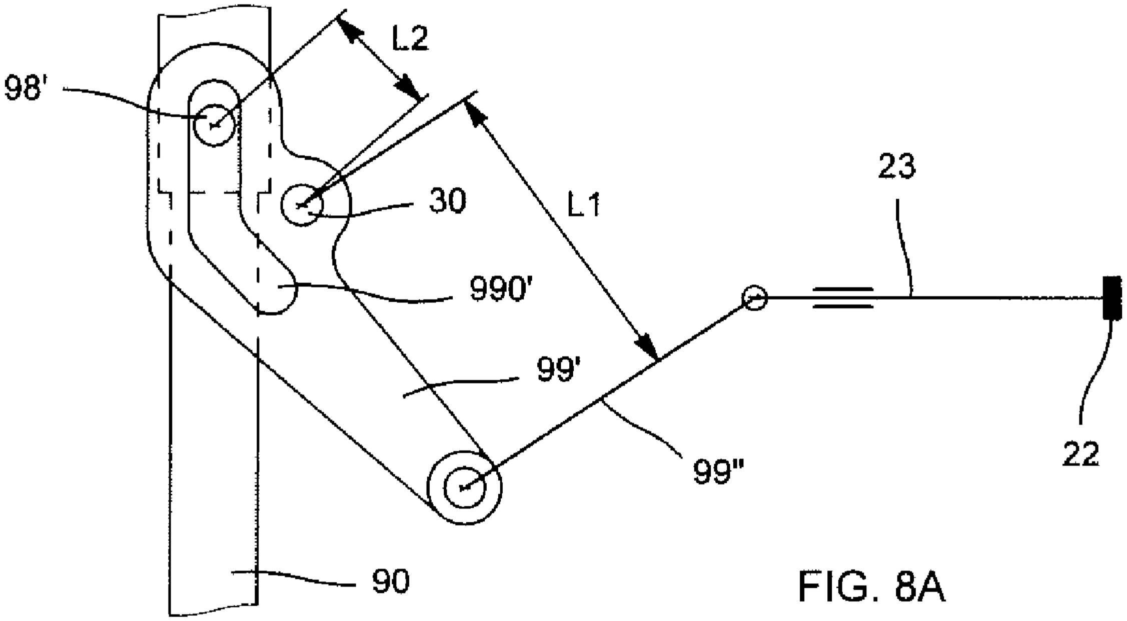
FIGS. 8A and 8B are two detail views showing two different positions with a modified version of part of the drive means in a switch unit in accordance with the second embodiment of the invention.

During the whole of the stage in the opening of the circuit breaker 1 (corresponding to the upper portion of FIGS. 7A and 7B), the pin 98' slides in the slot 990', which is oriented vertically, so that this involves no displacement of the coupling link 99" and therefore no straight line movement of the movable contact 22 of the disconnector 2 (see FIG. 8A).

Figure 8B:
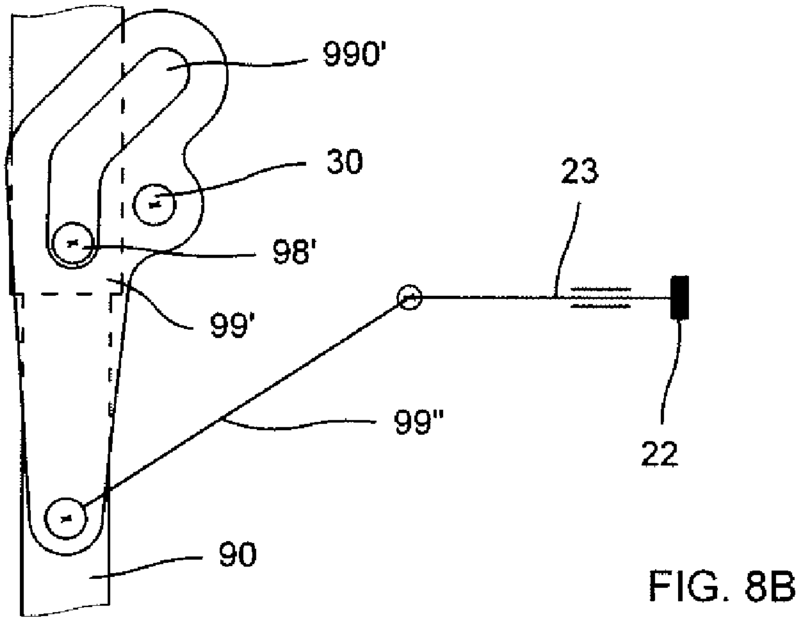

In a second stage in the opening of the disconnector 2 (corresponding to the right hand part of FIGS. 7C and 7D), the pin 98' comes into engagement against the slot in a zone in which the slot profile changes, and this causes the lever 99' to pivot abut the point of rotation 30 (see FIG. 8B).

Thus, the disconnector 2 is opened by pivoting movement of the lever 99', displacing the push rod 23 in straight line motion through the link 99". The ratio of the lengths L2/L1 (that is to say the ratio between the distance separating the point of rotation 30 of the lever and the point of articulation of the link 99", and the distance separating the point of rotation of the lever from the pin 98' fixed to the actuating rod 90) is so adapted that the movable contact 22 of the disconnector 2 is displaced with a reduced amount of displacement of the rod 90 (see FIG. 8).

During operation of the circuit breaker 1 by means of the actuating rod 90, the maneuvering forces that are applied (such as dynamic forces, pressure forces and friction forces) are converted by the lozenge 9 that transmits the movement, as is shown in FIGS. 7A to 7D, into a thrust force exerted by the guide rollers 96 and 97 in the associated guide grooves 960 and 970. These thrust forces generate additional rolling and friction forces, which may be large.

In order to reduce the forces involved while still enabling the shape of the lozenge to be changed, it is possible to add on a coupling device between the top pivot point 9*i* and the bottom pivot point 9*j* of the lozenge 9. The purpose of this complementary coupling device is to fasten together the push rod 13 and the actuating rod 90 over the whole of the stage of opening the circuit breaker, and to unfasten them from each other in order to permit the lozenge 9 to change shape over the whole of the stage of opening the disconnector 2. It is also possible, in combination with this complementary coupling device, to shorten the guide grooves 960 and 970, in order that the guide rollers 96 and 97 can slide and exert a pressure force only on the internal edges of the guide grooves, and only during the stage of closing the disconnector 2.

Figure 9A:
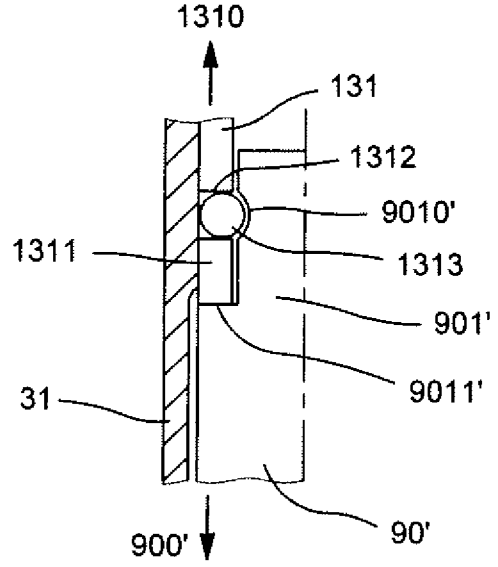
FIGS. 9A to 9C are detail section views, showing a modified version of another part of the drive means in a switch unit in accordance with the second embodiment of the invention.
Figure 9B:
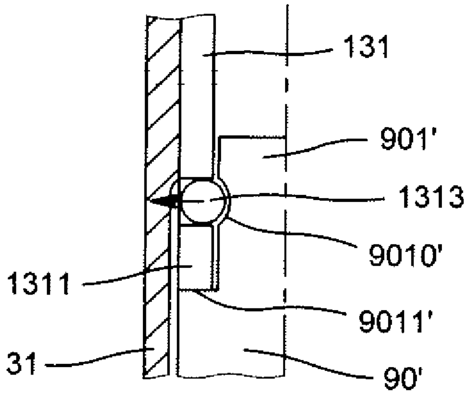
Figure 9C:
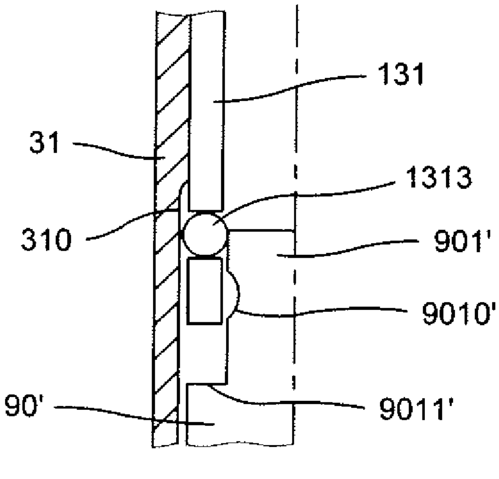

This modified version of the complementary coupling device and shortened guide grooves is shown in FIGS. 9A to 9C.

A hollow bar 131 is arranged with one of its ends, 1310, fixed to the push rod 13 of the movable contact 12, while the other end 1311 of the bar is formed at its periphery with through holes 1312, in which balls 1313 are mounted. The number of holes 1312 depends on the force to be transmitted between the hollow bar 131 and the actuating rod 90.

A further bar 90' has one end 900' secured to the actuating rod 90, and, at its other end, an end portion 901' that has a shape adapted so that it can be inserted partly within the hollow bar 131, and is formed with cavities 9010' of spherical bowl shape.

In the closed position of the circuit breaker (FIG. 9A), the end portion 901' of the bar 90' is mounted in the hollow bar 131, and is engaged against a shoulder 9011' formed in the end portion of the bar 90'.

A wall 31 is fixed to the inside of the metal casing, the arrangement being such that, firstly, the wall 31 masks the holes 1312 over part of the stroke of the drive rod 4, and the balls 1313 are therefore blocked against lateral movement, firstly by the fixed wall 31 and secondly by the spherical cavities 9010' (see FIG. 9A). The bar 131 and the bar 90' are therefore fixed together in downward straight line motion, and the lozenge is locked up so that its shape is kept unchanged.

The wall 31 is formed with a recess 310, which defines a clearance in such a way that, at the end of the opening operation of the circuit breaker 1, the balls 1313 are positioned facing the recess 310, and the thrust forces exerted by the spherical cavities 9010' push the balls towards the recess, as indicated by the arrows in FIG. 9B. The bar 90', and therefore the actuating rod 90, are thus unfastened from the push rod 13, although they remain coupled together through the lozenge 9, which enables maneuvering of the disconnector 2 to be continued while at the same time holding the circuit breaker 1 immobile (see FIG. 9C). During this operation of the disconnector 2, the guide rollers enter, and then slide in, the short, inclined grooves that, being convergent, bring the said guide rollers closer together so that the shape of the lozenge 9 is changed accordingly.

Figure 10:
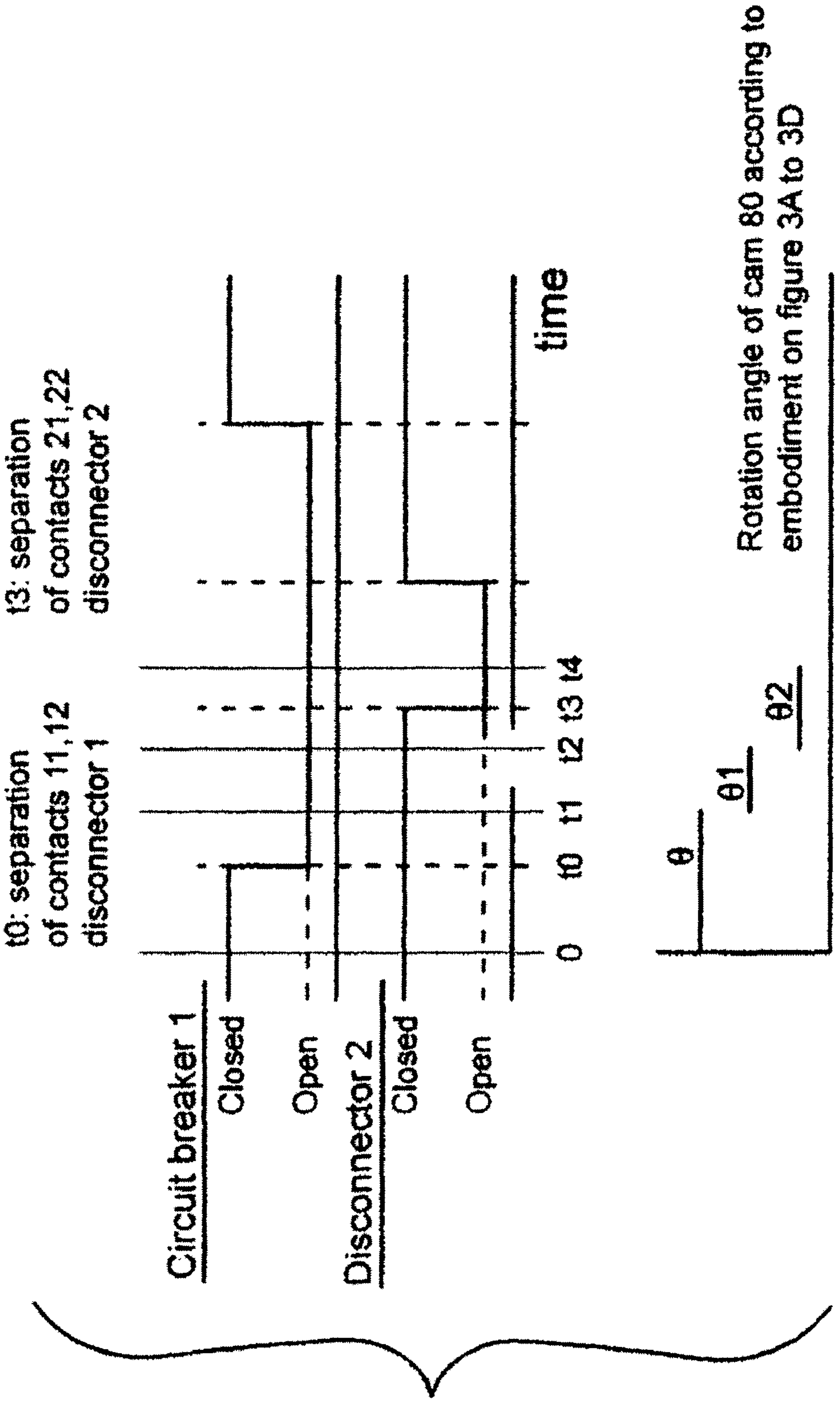
FIG. 10 shows the curves showing the separation of the contacts of a disconnector and of a circuit breaker in a switch unit in accordance with either embodiment of the invention shown in FIGS. 1 to 9.
Figure 11:
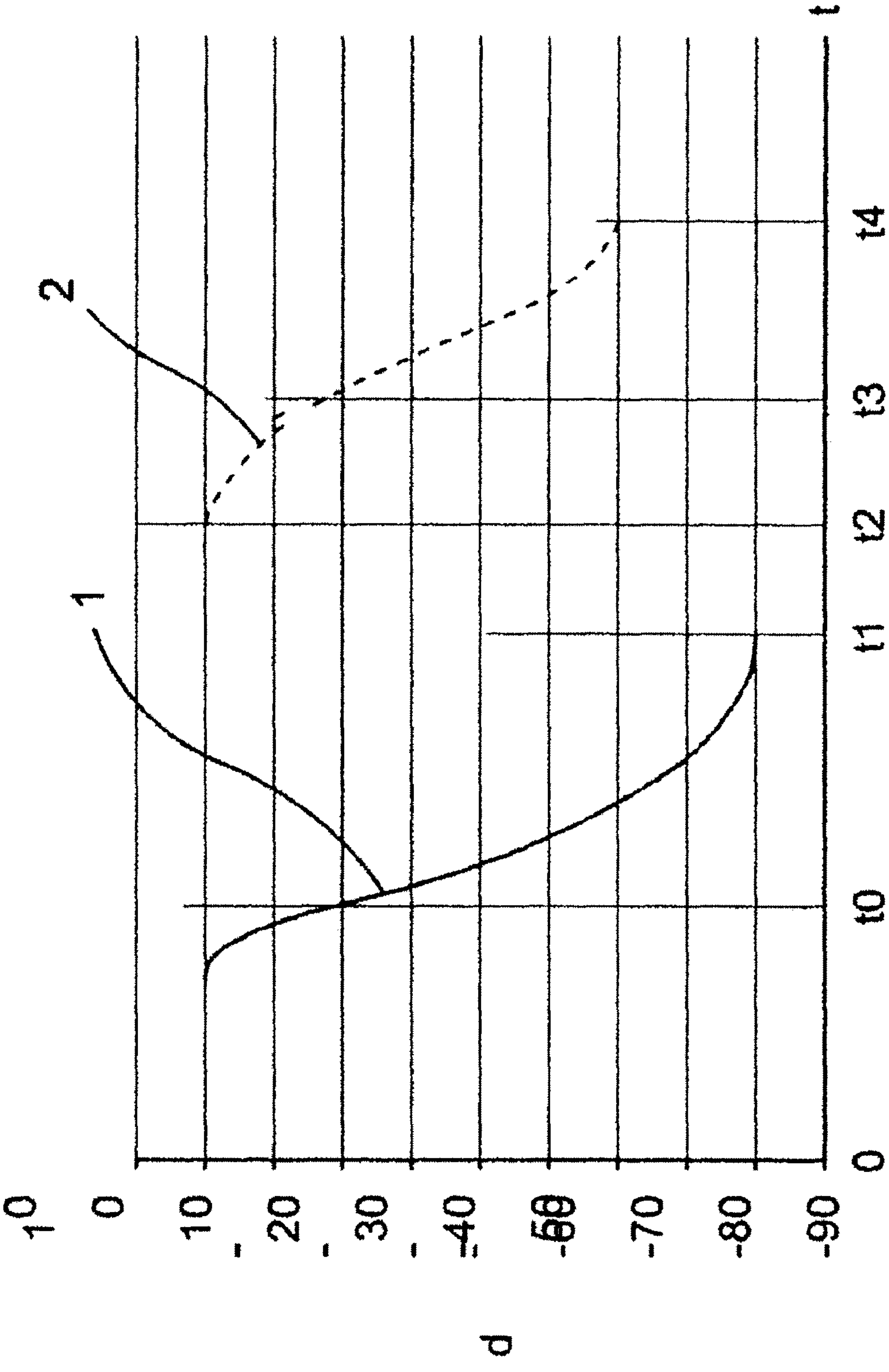
FIG. 11 shows the stroke of the opening movements of a disconnector and a circuit breaker, as a function of the times illustrated by FIG. 10.

FIGS. 10 and 11 illustrate the opening and closing sequences followed by the contacts of the disconnector and circuit breaker of the switch units in the two embodiments of the invention described above.

In FIG. 10, the instant to represents the order to open that is given to the control means of the circuit breaker connected to the drive rod 4. At the end of the time t0, which is typically of the order of 17 to 30 ms, the contacts 11 and 12 of the circuit breaker become separated.

Complete opening of the circuit breaker 1 occurs at the end of the time t1 (corresponding to the rotation through angle θ in the first embodiment). During a given time (t2–t1), the circuit breaker 1 and disconnector 2 remain immovable (this corresponds to the rotation through angle θ1 in the first embodiment).

At the end of the time t2 (corresponding to the end of rotation through angle θ1 in the first embodiment), the disconnector 2 begins its opening movement.

At the end of the time t3, the contacts 21 and 22 of the disconnector 2 open, and the disconnector reaches its fully open position at the end of the time t4 (corresponding to rotation of the cam through the complementary angle θ2 in the first embodiment).

In FIG. 11, the total opening stroke of the movable contact 12 of the circuit breaker 1 (represented by a continuous curve) is shown as being greater than that of the contact 22 of the disconnector 2 (represented by a broken curve), in a ratio greater than 1, typically equal to 80 mm/60 nm.

It is however possible, within the ambit of the invention, to modify, in accordance with the first embodiment, the external profile P and/or the internal profiles P1 and P2 of the cams, or, in accordance with the second embodiment, to modify the dimensions of the lozenge and its arrangement with the actuating rod, coupling means and means for varying the shape of the lozenge, in such a way as to obtain:

- firstly, a total opening time for the movable contact 12 of the circuit breaker 1 that is different from the total opening time of the movable contact 22 of the disconnector 2; and
- secondly, a total stroke length for the movable contact 12 of the circuit breaker 1 in a ratio that is different from that of the movable contact 22 of the disconnector 2.

In the second embodiment, and in accordance with the version using coupling by means of bars, the bar 131 shown is fixed to the push rod 13, while the bar 90' is fixed to the actuating rod 90. It is however possible, within the ambit of the invention, to make the bar 131 and push rod 13 as one piece. Similarly it is possible to make the bar 90' and actuating rod 90 in one piece.

In both of the embodiments shown in the drawings, the invention makes it possible to have drive means that are common to both a circuit breaker 1 and a disconnector 2, arranged at 90° to each other in the same switch unit. In accordance with the invention, the arrangement of the common drive means at the intersection of the axis of straight line motion of the contacts, and inside the same metal casing, enables the switch unit to be kept compact in size.

It is also possible, within the scope of the invention, to provide an arrangement of the disconnector in relation to the circuit breaker at an angle different from 90° of one relative to the other. The common drive means are still arranged at the intersection of the axes along which the contacts move, and inside a common metal casing.

The invention claimed is:

1. A switch unit comprising:

a circuit breaker;

a disconnector coplanar with the circuit breaker, the circuit breaker and the disconnector fixed to a metal casing, the circuit breaker and disconnector each having a pair of contacts that consists of a fixed contact and a contact that is linearly movable to separate the pair of contacts from each other in a switching operation;

a drive assembly common to the circuit breaker and disconnector, the drive assembly comprising:

a single insulating drive rod adapted for linear movement in the same plane as the linear movement of the movable contacts; and a mechanical assembly mounted in the metal casing and driven by the single insulating drive rod and permitting non-simultaneous linear movement of the two movable contacts wherein the said mechanical assembly comprises:

at least one cam mounted for rotation in the metal casing, the at least one cam having an outside profile and/or inside profiles that permit non-simultaneous linear movement of the two movable contacts in engagement against or in that cam; and return means disposed in the metal casing and adapted to maintain each of the said movable contacts in engagement against the outside profile and/or in the inside profiles of the cam(s) whatever the rotational position of the cam(s).

2. A switch unit according to claim 1, wherein the outside profile and/or the inside profiles of the or each cam is or are such as to permit, at the same time, the opening of the contacts of the circuit breaker before opening of the contacts of the disconnector, and closing of the contacts of the disconnector before closing of the contacts of the circuit breaker.

3. A switch unit according to claim 1, wherein the cam is coupled to the drive rod through a curved connecting rod adapted to permit the cam shaft to be bypassed.

4. A switch unit according to claim 1, wherein at least one said movable contact includes a push rod having a shoulder at an end of the push rod inside the metal casing, the said return means comprising at least one compression spring, coaxial with the push rod and in engagement, firstly against the said shoulder, and secondly against a portion of the metal casing separating it from the disconnector or circuit breaker, with the said push rod extending through the spring.

5. A switch unit according to claim 1, wherein at least one said movable contact includes a push rod having at its end a fork inside the metal casing, the said return means comprising at least one follower pin fixed on the ilmer side of one of the branches of the fork and engaged in a groove formed at the inner periphery of the cam.

6. A switch unit according to claim 1, wherein a single cam is mounted for rotation in the metal casing and is driven by the drive rod.

7. A switch unit according to claim 1, wherein three cams, two of which are of identical outside profiles, are mounted for rotation in the metal casing on the same cam shaft, and a single cam is driven by the drive rod, with at least one movable contact including a push rod having at its end a fork within the metal casing, with each of the branches of the fork being in engagement against a respective one of the two cams having identical outside profiles.

8. A switch unit according to claim 1, wherein the outside profile of the cam includes two continuous curves, such that, when the two movable contacts are in engagement jointly on one of the two curves, only the movable contact of the circuit breaker has a straight line movement, and when the cam has reached a given rotational position, one of the two movable contacts comes into engagement on the other one of the two curves.

9. A switch unit according to claim 8, wherein, when the cam has reached a rotational position more than 90° beyond its initial position in which the two contacts are closed, the movable contact of the circuit breaker is in engagement on one of the said curves, while the movable contact of the disconnector is in engagement on the other one of the said curves.

10. A switch unit according to claim 1, wherein at least one movable contact comprises a push rod having an end on which a follower roller is mounted for making rolling contact against the outer profile of the cam.

11. A switch unit comprising:

a circuit breaker;

a disconnector coplanar with the circuit breaker, the circuit breaker and the disconnector fixed to a metal casing, the circuit breaker and disconnector each having a pair of contacts that consists of a fixed contact and a contact that is linearly movable to separate the pair of contacts from each other in a switching operation;

a drive assembly common to the circuit breaker and disconnector, the drive assembly comprising:

a single insulating drive rod adapted for linear movement in the same plane as the linear movement of the movable contacts; and a mechanical assembly mounted in the metal casing and driven by the single insulating drive rod and permitting non-simultaneous linear movement of the two movable contacts, wherein the said mechanical assembly comprises:

four links of equal length, articulated together to form a lozenge, one of the pivot points of the lozenge being fixed to the movable contact of the circuit breaker;

an actuating rod having one end fixed to the insulating drive rod and another end fixed to the pivot point of the lozenge opposite the pivot point that is fixed to the movable contact of the circuit breaker;

coupling means coupling together the movable contact of the disconnector and the said actuating rod; and lozenge shape varying means, for causing the shape of the lozenge to vary while it is being driven by the insulating drive rod, the said lozenge, drive rod, and lozenge shape varying means being so arranged relative to each other as to permit non-simultaneous straight line movement of the pivot point of the lozenge that is fixed to the movable contact of the circuit breaker and of the movable contact of the disconnector coupled with the said actuating rod.

12. A switch unit according to claim 11, wherein the said coupling means comprise a coupling groove in fixed relation with the actuating rod and having a non-straight profile, and a coupling roller fixed to the movable contact of the disconnector and engaged in the coupling groove of the actuating rod, the coupling groove being arranged to enable the coupling roller to slide in the coupling groove during the whole stroke of the drive rod, but to enable the roller to move in a straight line during only a portion of the said stroke.

13. A switch unit according to claim 12, wherein, in order to permit opening of the contacts of the circuit breaker before opening of the contacts of the disconnector and, at the same time, closing of the contacts of the disconnector before closing of the contacts of the circuit breaker, the articulated lozenge and the actuating rod are so arranged in relation to each other that:

over a first stroke of straight movement, the lozenge is displaced in the same direction as the drive rod, while keeping its shape identical, and the coupling roller slides in the coupling groove without there being any straight line movement of the movable contact of the disconnector; and over a second stroke of straight movement of the drive rod, being a continuation of the said first stroke, the pivot point of the lozenge that is fixed to the movable contact of the circuit breaker remains stationary, while its shape changes and the coupling roller slides in the coupling groove, with the moving contact of the disconnector moving in a straight line.

14. A switch unit according to claim 11, wherein the said coupling means comprise:

a guide pin fixed on the actuating rod;

a coupling lever mounted for rotation in the metal casing and formed with a slot having a non-straight profile, in which the guide pin fixed on the actuating rod is engaged;

a connecting link articulated between the coupling lever and the movable contact of the disconnector, with the guide pin, coupling lever and connecting link being so arranged in relation to each other as to permit the guide pin to slide in the slot during the whole stroke of the drive rod, but to permit the lever to pivot during only a portion of the said stroke.

15. A switch unit according to claim 11, wherein a roller is mounted on the guide pin fixed to the actuating rod whereby to provide rolling coupling.

16. A switch unit according to claim 11, wherein the said lozenge shape varying means comprise:

two non-straight guide grooves, each consisting of a straight first portion and a straight second portion continuous with the said straight first portion, the said grooves being so arranged in relation to each other that the straight first portions are parallel to each other and the straight second portions are convergent with each other; and two guide rollers, each of which is fixed at a further pivot point of the lozenge, the said further pivot point not being itself fixed relative to the movable contacts of the circuit breaker and disconnector, each said guide roller being adapted to be mounted in a respective one of the two non-straight guide grooves, the lozenge, and the guide grooves being arranged in relation to each other in such a way that:

during the first stroke of straight movement of the drive rod, each guide roller slides in the straight first portion of the corresponding guide groove so as to keep the shape of the lozenge unchanging; and during the second stroke of straight movement of the drive rod, continuous with the said first stroke, each guide roller slides in the straight second portion of the corresponding guide groove, thereby causing the shape of the lozenge to change.

17. A switch unit according to claim 11, wherein the said lozenge shape varying means for the lozenge comprise:

a wall fixed inside the metal casing;

a hollow bar having one end fixed to the movable contact of the circuit breaker, with its other end being formed at its periphery with open holes in which balls are mounted, its shape being adapted so that it is surrounded by the fixed wall;

a bar having one end that is fixed to the actuating rod, with its other end being formed with spherical bowl-shaped cavities and being of a shape adapted so that it is partly embedded in the hollow bar;

two straight guide grooves, convergent towards each other; and two guide rollers, each of which is fixed to a further pivot point of the lozenge, the said further pivot point not being itself fixed relative to the movable contacts of the circuit breaker and disconnector, each guide roller being adapted to be mounted in one of the two guide grooves, with the lozenge, the fixed wall, the bars and the guide grooves being arranged in relation to each other in such a way that:

during the first stroke in the straight movement of the drive rod, the bars are fastened together by virtue of the lateral blocking of the balls firstly by the fixed wall, and secondly by the spherical bowls, so as to keep the shape of the lozenge unchanged; and at the start of the second stroke in the straight movement of the drive rod, continuous with the said first stroke, the bars are unfastened from each other by lateral release of the balls on the side of the fixed wall;

and at the end of the said second stroke, each guide roller slides in the corresponding straight, convergent guide groove, thereby causing the shape of the lozenge to change.

* * * * *